(12) United States Patent
Oktem

(10) Patent No.: US 6,763,068 B2
(45) Date of Patent: Jul. 13, 2004

(54) METHOD AND APPARATUS FOR SELECTING MACROBLOCK QUANTIZATION PARAMETERS IN A VIDEO ENCODER

(75) Inventor: Levent Oktem, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 230 days.

(21) Appl. No.: 10/035,017

(22) Filed: Dec. 28, 2001

(65) Prior Publication Data

US 2003/0128756 A1 Jul. 10, 2003

(51) Int. Cl.[7] ................................................ H04N 7/12

(52) U.S. Cl. ................................................ 375/240.03

(58) Field of Search ........................ 375/240.01, 240.03, 375/240.05, 240.06, 240.13, 240.25; 348/404.1, 405.1, 419.1, 424.1; 382/239, 251, 253; H04N 7/12

(56) References Cited

U.S. PATENT DOCUMENTS

| 5,686,963 | A | * | 11/1997 | Uz et al. | 375/240.06 |
|---|---|---|---|---|---|
| 5,929,916 | A | * | 7/1999 | Legall et al. | 375/240.05 |
| 6,043,844 | A | * | 3/2000 | Bist et al. | 375/240.24 |
| 6,205,174 | B1 | * | 3/2001 | Fert et al. | 375/240.03 |
| 6,249,546 | B1 | * | 6/2001 | Bist | 375/240.03 |
| 6,639,942 | B1 | * | 10/2003 | Bayazit | 375/240.01 |
| 2003/0007563 | A1 | * | 1/2003 | Ryu | 375/240.13 |

FOREIGN PATENT DOCUMENTS

| WO | WO 97/37322 | 10/1997 | ............. G06K/9/36 |
|---|---|---|---|
| WO | WO 98/38800 | 9/1998 | ............. H04N/7/30 |

OTHER PUBLICATIONS

*Low Bit–Rate Coding of Image Sequences Using Adaptive Regions of Interest*, N. Koulamis, et al, IEEE Transactions on Circuits and Systems for Video Technology, vol. 8, No. 8, Dec. 1998.
*Video Segmentation for Content–Based Coding*, Thomas Meier, King Ngan, IEEE Transactions on Circuits and Systems for Video Technology, vol. 9, No. 8, Dec. 1999.
*Viterbi Algorithm*, University of Leeds, Hidden Markov Models, published on the Internet before Dec. 28, 2001.
*MPEG–4 Systems: Overview*, A. Olivier, et al, published on the Internet before Dec. 28, 2001.
*MPEG–4: Why, What, How and When?*, F. Pereira, published on the Internet before Dec. 28, 2001.
*MPEG–4 Multimedia for our Time*, R. Koenen, KPN Research, published on the Internet before Dec. 28, 2001.
*Digital Signal Processing Comes of Age*, by Rose Marie Piedra and Andy Fritsch, Texas Instruments, Inc., Copyright 1996, The Institute of Electrical and Electronic Engineers, Inc.
*Digital Television: Making it Work*, Bhavesh Bhatt, Sarnoff Corp., published on the Internet before Dec. 28, 2001.

(List continued on next page.)

Primary Examiner—Nhon Diep
(74) Attorney, Agent, or Firm—Ware, Fressola, Van Der Sluys & Adolphson

(57) ABSTRACT

A method and corresponding apparatus for selecting a sequence of quantization parameter values in a video encoder, the video encoder being arranged to encode a video frame as a sequence of n macroblocks and to assign a quantization parameter value for each macroblock of the video frame. The method includes steps (23 24 25) in which quantization parameter values assigned to at least a subset of said sequence of n macroblocks are optimized in such a way as to minimize a cost associated with their encoding.

22 Claims, 3 Drawing Sheets

OTHER PUBLICATIONS

*Chiariglione and the birth of MPEG*, William Sweet, published on the Internet before Dec. 28, 2001.

*HDTV in Wonderland*, P. Lubell, published on the Internet before Dec. 28, 2001.

*International Telecommunication Union, ITU–T, H.261 (03/93) Line Transmission of Non–Telephone Signals, Video Codec for Audiovisual Services at px64 bits*, Mar. 1993, published on the Internet.

*ITU–T, H.263 (02/98) Series H: Audiovisual and Multimedia Systems Infrastructure of audiovisual services—Coding of moving video*, Feb. 1998, published on the Internet.

*Perceptually Based Video Rate Control Using Pre–filtering and Predicted Rate–Distortion Characteristics*, Liang–Jin Lin, Antonia Ortega, IEEE, Jul. 1997.

*A DCT–Domain H.263 Based Video Combiner for Multipoint Continuous Presence Video Conferencing*. D–Jin Shiu, IEEE, Sep. 1999.

*MPEG4 Video Verification Model, VM 18.0, N3908*, Jan. 2000, published on the Internet before Dec. 28, 2001.

* cited by examiner

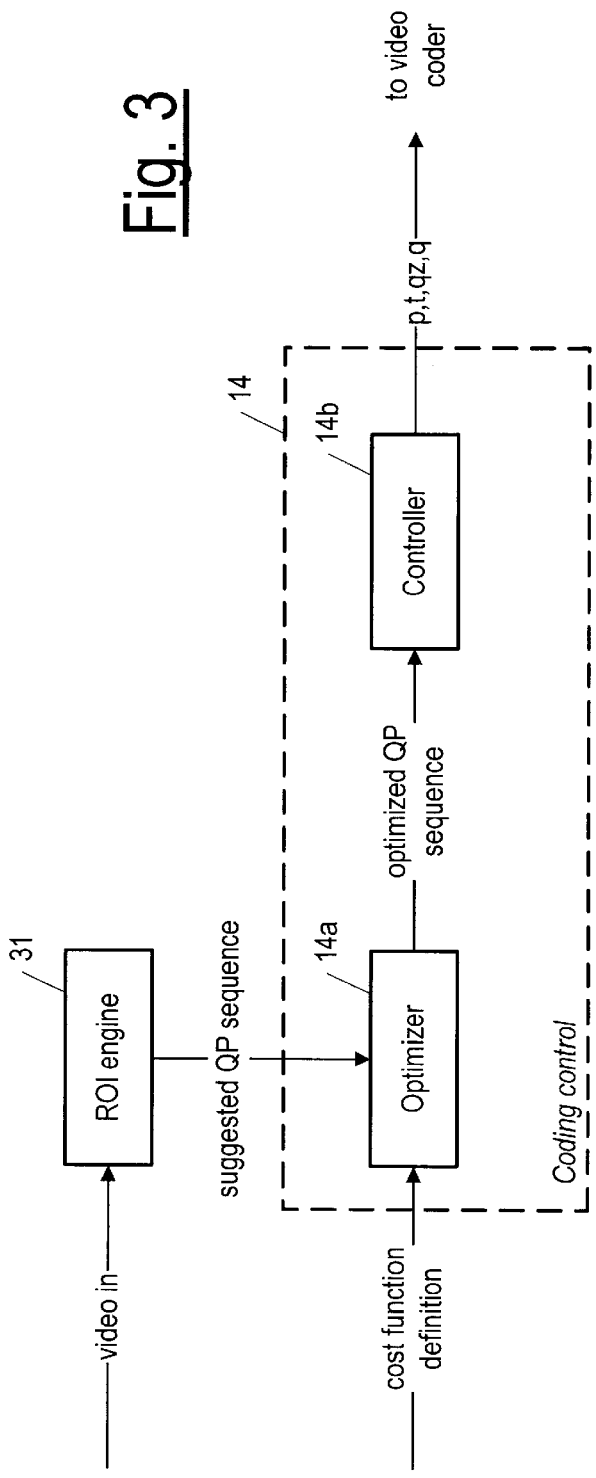

METHOD AND APPARATUS FOR SELECTING MACROBLOCK QUANTIZATION PARAMETERS IN A VIDEO ENCODER

FIELD OF THE INVENTION

The invention relates to a video coding system. In particular, it relates to two standard systems for the compression of video sequences using motion-compensated prediction: ITU-T H.263 and MPEG-4 Very Low Bitrate Video (VLBV).

BACKGROUND OF THE INVENTION

Two standard systems for the compression of video sequences using motion-compensated prediction are: ITU-T H.263, described in *ITU-T SG* 15 *Experts Group for Very Low Bitrate Visual Telephony,* Draft Recommendation H.263, February 1995; and MPEG-4 Very Low Bit rate Video (VLBV), described *MPEG-4 Video Verification Model—Version* 5.0, by the MPEG Video Group, Doc. ISO/IEC/JTCI/SC29/WG11, N1469 Maceio, November 1996. There have been some extensions to H.263 after the definition of Version 1. The extended version is often referred to as H.263+. The term H.263 is used here to refer to the un-extended version, i.e. Version 1. Because of the similarity between the algorithms employed in MPEG-4 VLBV and in H.263, the discussion here will focus on algorithms for H.263.

H.263 is an ITU-T recommendation for the compression of video sequences at low bit rates (<64 kbits/sec), and is based on an earlier ITU-T recommendation, H.261. A block diagram of the control components of an H.263 encoder is depicted in FIG. 1. (The video coder is not shown.) The main elements of such an encoder are a prediction module 11, a pair of block transformation modules 12 (the transform modules T and T⁻), and a pair of quantization modules 13 (the quantizer modules Q and Q⁻). In addition, there is a coding control module 14.

The coding control module 14 determines all coding parameters; it acts as the brain of the system. The INTRA/INTER decision data flow from the coding control signals whether the knowledge of previous frames will be exploited for encoding the current frame.

The quantization indication data flow provided by the coding control module determines what are called quantizer parameters to be used for each macroblock. The determination can be at the frame level or at the macroblock level. The invention focuses on the generation of this signal.

The 'video multiplex coder' referred to in FIG. 1 is simply a multiplexer, and does not use 'video in' as one of its inputs. The signals indicated as being provided "to video multiplex coder" comprise the compressed representation of a video signal.

To exploit the temporal correlation between successive frames, the system first performs a motion-compensated prediction if previously reconstructed frames are available and useful, the term 'useful' indicating that using the previous frames (INTER coding) would yield better compression performance than not using them (INTRA coding). If the consequent frames are not sufficiently correlated, it may be possible that INTRA coding yields better compression performance. The system first performs the motion-compensated prediction using motion information and the previously reconstructed frames. The motion information (v in FIG. 1) is transmitted (from encoder to decoder) in order to allow the decoder to perform the same prediction as the prediction performed in the encoder. Next, a block transform, referred to as a DCT (i.e. a Discrete Cosine Transform), is applied to the prediction error (or the frame itself in the case of no prediction) in the block T to exploit the spatial correlation. Finally, the DCT coefficients of the prediction error are quantized and entropy coded in the block Q. The quantizer is the main mechanism for introducing loss to the video sequence to achieve higher compression. The amount of loss (and thus the bit rate) is controlled by the quantizer step size, which in turn is parameterized by a quantizer parameter (QP), having integer values between 1 and 31 and provided by the coding control module 14 to the block Q. QP must be known to the decoder, so it is transmitted as side (ancillary) information (and designated as qz in FIG. 1).

A fundamental layer of H.263 is the macroblock layer. A macroblock (MB) is the basic building block of H.263 in the sense that the main elements of encoding (prediction, block transformation and quantization) can be performed by processing one macroblock at a time. A macroblock consists of the representations of a 16×16 luminance block, two 8×8 chrominance blocks, and macroblock-level coding parameters (such as macroblock type, etc.); some macroblock-level coding parameters are optional. Macroblocks are transmitted in raster scan order. The macroblock-level coding parameters are encoded at the macroblock level only when there is a need to do so, since they are costly in terms of bits. (There is a frame-level encoding of the coding parameters such as the quantization parameter QP. When macroblock-level encoding is not performed, these frame level values are used.)

H.263 provides limited macroblock-level control of QP; there is an optional 2-bit DQUANT field that encodes the difference between the QP of the current macroblock and the QP of the previously encoded macroblock. (See Section 5.3.6 of H.263+(February 1998).) Due to the bit-field restriction described in section 5.3.6 of H.263, the macroblock QP can be varied by at most ±2 each time it is changed. In a scenario where QP variation is used for rate control, such a restriction on the range of variation of QP is quite sufficient. However, there may be other reasons to vary QP besides rate control, such as region-of-interest coding, which is a technique of allocating more bits (and thus introducing less loss) to an automatically-detected or user-defined region of interest, such as a human face.

The Problem Solved by the Invention

Consider a scenario for which macroblock-level QP variation is needed for a purpose other than rate control, such as region-of-interest (ROI) coding. In such a scenario, limited macroblock-level control of QP poses a significant restriction. An arbitrary QP distribution either suggested by a region-of-interest analyzer or input by a user cannot be fully realized by an H.263 (or MPEG-4 VLBV) encoder. Thus, such an encoder needs to choose an approximate realization that is as close to the originally suggested distribution as possible, in some defined sense. Given a definition of optimality (or equivalently a measure of cost), the invention provides a method to optimally choose the realization, i.e. it provides a method to minimize the total cost incurred by constrained realization, the total cost being defined so as to be lower the closer the QP distribution is to the suggested distribution, but higher the more bits that must be used.

As a related problem, in H.263+, defined in *ITU-T SG* 15 *Experts Group for Very Low Bitrate Visual Telephony,* Draft Recommendation H.263 Version 2, January 1998, an exact representation of an arbitrary distribution may be very costly in terms of a bit budget, and hence may not be the most desirable solution. Quantization can be varied on a macroblock basis, and no finer variation is possible. By an exact representation of an arbitrary distribution is meant an arbitrary selection of macroblock QPs. Consider a vector QP, formed by assigning a separate QP for each macroblock. Representing some of the component vectors cost much less (in bits) than representing others. If a QP is chosen for each macroblock without considering the QP values of the neighboring macroblocks, it is likely that a prohibitively high number of bits will be spent in representing the variation of QP from block to block.

An encoder needs to find the best trade-off between following the original suggestion (for a QP distribution) by a region of interest analyzer on the one hand, and minimizing the total bits spent for QP variation on the other. For this related problem, the invention provides a method for finding the best trade-off when the cost function is defined to represent the trade-off.

How the Problem was Solved Earlier

According to the prior art, for MPEG-4 video encoders employing ROI coding, QP control is achieved through the separation of each frame into two video-object planes (VOPs), a foreground VOP and a background VOP, as described in *Low Bit-Rate Coding of Image Sequences Using Adaptive Regions of Interest,* by N. Doulamis, A. Doulamis, D. Kalogeras, and S. Kollias, IEEE Tran. on CAS for Video Technology, pp. 928–934, vol. 8, no. 8, December 1998, and as also described in *Video Segmentation for Content-Based Coding,* by T. Meier, and N. Ngan, IEEE Tran. on CAS for Video Technology, pp. 1190–1203, vol. 9, no. 8, December 1999. Such a separation overcomes the ±2 variation restriction at foreground/background separation boundaries.

The prior art solution has two shortcomings. First, there is a bit overhead for encoding VOP segmentation, which might become prohibitive if the foreground is not compact. It is difficult to take these bits into account when deciding on the foreground/background separation. Thus, optimization is difficult, if not impossible. Second, the prior art solution does not directly provide graded QP control within each VOP (i.e. variable within each VOP). The value of QP must be varied further within the background and/or within the foreground to achieve graded control within each VOP. There is still a restriction on how QP can be varied, and optimization becomes even more impractical than the original problem of delicate QP control within a single VOP comprising the whole frame.

In H.263, VOP structure is not supported. So, even this solution is not available. Hence, ±2 variation restriction applies to all macroblocks in H.263. There is thus no technique in H.263 for frame-level optimization of macroblock QP selection for ROI coding (or any other scenario requiring delicate QP control).

H.263+ provides a bit-costly mechanism for precise QP control; it is possible to represent an arbitrary QP for a macroblock by spending (using) 6 bits. For very low bit rate applications (which are the main focus of H.263 and H.263+), representing an arbitrary QP distribution can easily become prohibitive in terms of a bit budget, so a frame-level optimization is especially advantageous. However, as in H.263, there is no known technique in H.263+ for frame-level optimization of macroblock QP selection for ROI coding (or any other scenario requiring delicate QP control).

What is needed is a mechanism for providing precise QP control, i.e. frame-level control, in a way that is not bit-costly so as to be of use in low bit-rate applications.

SUMMARY OF THE INVENTION

Accordingly, a first aspect of the invention provides a method for selecting a sequence of quantization parameter values in a video encoder, the video encoder being arranged to encode a video frame as a sequence of n macroblocks and to assign a quantization parameter value for each macroblock of the video frame, the method characterized in that quantization parameter values assigned to at least a sub-set of said sequence of n macroblocks are optimized in such a way as to minimize a cost associated with their encoding.

In accord with the first aspect of the invention, said sub-set of said sequence of n macroblocks may comprise all of said n macroblocks.

Also in accord with the first aspect of the invention, optimization of said quantization parameter values assigned to at least a sub-set of said sequence of n macroblocks may be performed using a Viterbi search algorithm.

Also in accord with the first aspect of the invention, optimization of said quantization parameter values assigned to at least a sub-set of said sequence of n macroblocks may be performed by comparing a cost associated with encoding a suggested sequence of quantization parameter values with a cost of encoding a candidate sequence of quantization parameter values.

Still also in accord with the first aspect of the invention, in applications where the method is for providing frame-level control of a quantizer parameter QP of a video encoder, the video encoder having one quantizer parameter for each macroblock of a frame, a frame consisting of a number n of macroblocks, the method providing an optimizing quantizer parameter sequence Q* from among a set of all possible quantizer parameter sequences having a quantizer parameter sequence Q as an arbitrary element serving as a candidate quantizer parameter sequence, the optimizing quantizer parameter sequence Q* minimizing a cost function C(Q,S) indicating a cost of using the candidate quantizer parameter sequence Q in place of a suggested quantizer parameter sequence S, the method may include: a step of receiving a suggested quantizer parameter sequence S; a step of defining a cost function C(Q,S) having a component D(Q,S) representing a discrepancy between the candidate sequence Q and the suggested quantizer parameter sequence S as measured according to a predetermined criterion, and having a component R(Q) proportional to the number of bits spent in representing the candidate sequence Q; and a step of determining the optimizing quantizer parameter sequence Q* as that which minimizes the cost function C(Q,S); thereby providing an optimizing quantizer parameter sequence Q* that approximates the suggested quantizer parameter sequence S in a bit-efficient way.

Further, the suggested quantizer parameter sequence S may be provided by a region-of-interest analyzer.

Also further, the step of determining the optimizing quantizer parameter sequence Q* as that which minimizes the cost function C(Q,S) may comprise the step of computing, for a value k falling in the range of quantizer parameter values spanned by the quantizer parameters of the suggested quantizer parameter sequence S, an optimum constrained cost function $C^*_k(S_t)$, the optimum constrained cost function being a function of a partial suggested quantizer parameter sequence $S_t$ of a number t of quantizer parameters and indicating the lowest cost achievable by using any possible partial candidate quantizer parameter sequence $Q_{t,k}$ having as a last, $t^{th}$ element a quantizer parameter with the value k.

Still also further, the step of determining the optimizing quantizer parameter sequence Q* as that which minimizes the cost function C(Q,S) may comprise the substeps of: determining from the suggested quantizer parameter sequence S a range of quantizer parameter values from a predetermined minimum to a predetermined maximum; setting a sequence length t equal to one; setting a value k equal to the predetermined minimum; computing an optimum constrained cost function $C^*_k(S_t)$, the optimum constrained cost function being a function of a partial suggested quantizer parameter sequence $S_t$ of the number t of quantizer parameters, the computing of the optimum constrained cost function for t greater than one being based on a recursion relation giving $C^*_k(S_t)$ in terms of $C^*_k(S_{t-1})$ and involving a term $r(k,j)+C^*_j(S_{t-1})$, where r(k,j) is an element of the cost function component R(Q) proportional to the number of bits spent in representing Q with the variable j having a value in the range determined from the suggested quantizer parameter sequence S; storing for the current t and k the value of j that minimizes the term $r(k,j)+C^*_j(S_{t-1})$; computing the optimum constrained cost function $C^*_k(S_t)$ and storing for the current t and k the value of j that minimizes the term $r(k,j)+C^*_j(S_{t-1})$ for successive values of k each greater by one than the previous until k is equal to the predetermined maximum and for successive values of t each greater by one than the previous value of t until t is equal to the number of macroblocks in a frame; determining the optimum cost function $C^*(S_{t=n})$ based on a comparison of $C^*_k(S_{t=n})$ for all k values in the range of quantizer parameter values in the suggested sequence S; and constructing the optimizing sequence Q* by a process of first setting the quantizer parameter for the last macroblock equal to the value of k that minimizes $C^*_k(S_{t=n})$, and then tracing backward, assigning to each previous quantizer parameter in the optimizing sequence being constructed the value of j stored for the next macroblock.

Still even also further, the cost function component D(Q, S) may be of the form given by the equation, $$D(Q,S) = \sum_{i=1}^{n} d(q_i, s_i),$$

where $d(q_i,s_i)$ is a memoryless macroblock-level nonnegative cost component having as arguments an element $q_i$ of the candidate quantizer parameter sequence and a corresponding element $s_i$ of the suggested quantizer parameter sequence; the cost function component R(Q) may then be of the form given by the equation, $$R(Q) = \sum_{i=1}^{n} r(q_i, q_{i-1}),$$

where $r(q_i,q_{i-1})$ is a memoryless macroblock-level nonnegative cost component expressing a relation between the number of bits used to encode the quantizer parameter for macroblock i and the number of bits used to encode the quantizer parameter for macroblock i−1; an element $r(q_i,q_{i-1})$ of the cost function component R(Q) may then be given by the equation, $$r(q_i, q_{i-1}) = \begin{cases} 0, & \text{for } |q_i - q_{i-1}| \leq 2 \\ +\infty, & \text{otherwise} \end{cases},$$

and an element $d(q_i,s_i)$ of the cost function component D(Q,S) may be given by the equation $$d(q_i,s_i)=(q_i-s_i)^2;$$

and in addition, an element $r(q_i,q_{i-1})$ of the cost function component R(Q) may then be given by the equation, $$r(q_i, q_{i-1}) = \begin{cases} \lambda N_{q_i,q_{i-1}}, & \text{if } q_i \text{ is representable} \\ +\infty, & \text{otherwise} \end{cases},$$

in which λ is a predetermined nonnegative value useful as a rate distortion trade-off parameter and in which $N_{q_i,q_{i-1}}$ is the number of bits for representing $q_i$ given $q_{i-1}$; and still also, an element $d(q_i,s_i)$ of the cost function component D(Q,S) may be given by the equation $$d(q_i,s_i)=\|mse(q_i)-mse(s_i)\|,$$

where mse( . . . ) denotes the mean square error between the original macroblock content and macroblock content reconstructed using the indicated quantizer parameter sequence element $q_i$ or $s_i$.

In accord with a second aspect of the invention, an apparatus is provided for performing the method according to the first aspect of the invention.

Thus, the invention is based on a frame-level algorithm for optimal selection of macroblock QPs. The optimizing criterion can be externally defined, which allows customizing the algorithm to different modes of operation. Although the algorithm employs a dynamic programming approach, the computational complexity of the core algorithm is reasonably low.

The invention is, to the inventor's knowledge, the first method for frame-level optimization of macroblock QP selection in either the H.263(+) or MPEG-4 framework. In a delicate QP control scenario, the optimization of the invention yields better utilization of a constrained bit budget than the prior art, which provides suboptimal delicate QP control. For example, an H.263+ encoder provides the capability of fully controlling QP variation, but at a high cost (in bits). Furthermore, an H.263 encoder can only suboptimally approximate a QP variation suggested by an ROI coding engine. Good utilization of a bit budget is especially advantageous in very low bit rate video compression applications.

The computational complexity of the core algorithm is reasonably low. If the computational cost of calculating the values of the elements of the cost function, e.g. the elements $r(q_i,q_{i-1})$ and $d(q_i,s_i)$ in some embodiments, is not taken into account (because the elements of the cost function are usually calculated outside the core algorithm), then the core algorithm typically executes approximately one addition and one comparison operation (or less) per pixel. (There are 256 pixels in a macroblock.) Such a number of operations per pixel is very small overhead for a high performance video encoder.

BRIEF DESCRIPTION OF THE DRAWINGS

The above and other objects, features and advantages of the invention will become apparent from a consideration of the subsequent detailed description presented in connection with accompanying drawings, in which:

FIG. 3 is a block diagram/flow diagram of some of the components of the coding control module of FIG. 1.

FIG. 4 is a graph illustrating results of computations according to the invention.

BEST MODE FOR CARRYING OUT THE INVENTION

Figure 1:
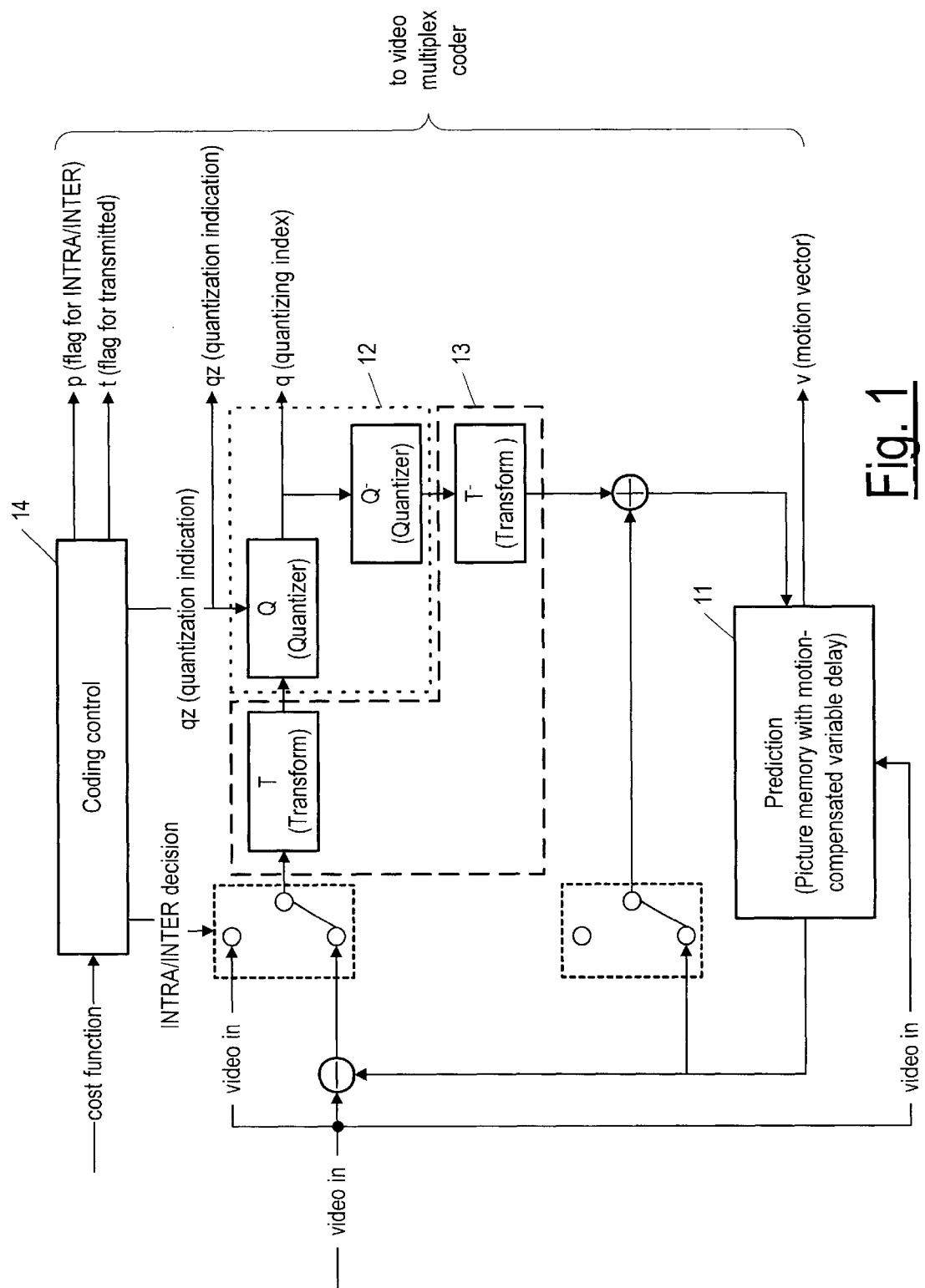
FIG. 1 is a block diagram of an H.263 encoder of a type for which the algorithm of the invention is useful, including as its main elements a prediction module, block transformation modules, and quantization modules, all under the control of a coding control module.

The disclosure here is provided in the context of the H.263 standard (i.e. to encoders according to the H.263 standard), but the invention is also directly applicable to the MPEG-4 VLBV standard, due to the similarity between the two standards.

The optimization algorithm is a form of the so-called Viterbi algorithm, in which the optimal QP sequence is sought for each frame. The Viterbi algorithm is described in *THE VITERBI ALGORITHM,* by G. D. Forney, Jr., Proc. IEEE, pp. 268–278, March 1973.

The term QP sequence is here used to indicate a data object having a length equal to the number of macroblocks in a frame, and constructed by picking the QP assigned to each macroblock, in raster scan order. Before going into more detail, it is necessary to define some expressions and to present the notation used here.

Definitions and Notation

Let $s_i$ denote the QP value suggested by a region of interest (ROI) coding engine for the $i^{th}$ macroblock, and $S=\{s_i\}$ denote the QP sequence suggested by the ROI coding engine for the frame being encoded. Let $Q=\{q_i\}$ denote any candidate QP sequence to be assigned by the optimization algorithm as the selected QP sequence of the frame in response to the requested S. The length of each of the sequences Q and S is equal to the number of macroblocks in a frame. Let this length be denoted by n.

Denote a partial suggested QP sequence $\{s_i\}_{i=1 \ldots t}$ (i.e. $\{s_1, s_2, \ldots, s_t\}$) by $S_t$, where $t \leq n$. According to this notation, $S_n = S$. Similarly, use $Q_t$ to denote a partial candidate QP sequence. As a slightly constrained form of $Q_t$, let $Q_{t,k}$ denote a partial sequence $Q_t$ whose last element $q_t = k$ (where k is an integer in the interval [1, 31]). Thus, for example, if t=5 (and is less than the number n of macroblocks in a frame), and k=8, then $Q_t$ might be the sequence {3, 5, 2, 4, 8}, but would be any sequence having five elements, with the last element having the value 8.

Let C(Q,S) denote some cost of selecting Q as the QP sequence when S is the suggested QP sequence. For a cost function C(Q,S) to be sensible (i.e. consistent with intuition), it should have at least the following properties.
a) C(Q,S) must be non-negative.
b) If Q is not representable, then the associated cost C(Q,S) is defined to be infinity. (A QP sequence is said to be representable if a video encoder can encode it without changing its value. For example, the QP sequence {5, 12, . . . } is not representable by an H.263 encoder, because the consecutive QP values encoded by an H.263 encoder cannot differ by more than +−2, whereas in this example 12 and 5 differ by 7. By convention, we can say that it requires infinitely many bits to represent the sequence {5, 12, . . . }, so that sequence is never selected as the optimal approximation.)
c) It must have a component directly or indirectly proportional to the discrepancy between Q and S as measured according to a predetermined criterion. Such a difference or discrepancy component, denoted here by D(Q,S), pushes the optimizer to choose a QP sequence close to S. In most practical cases, D(Q,S) can be a summation of so-called memoryless macroblock-level non-negative cost components given by, $$D(Q, S) = \sum_{i=1}^{n} d(q_i, s_i), \quad (1)$$

the term memoryless being used here to mean that the cost component for $i^{th}$ macroblock does not depend on $q_k$ and $s_k$ if $i \neq k$. It is, however, not necessary that D(Q,S) have the particular form given by equation (1).
d) It should have a component, called here R(Q), that is proportional to the bits spent for representing Q and does not depend on S. (The value of R(Q) is the number of bits needed to encode a QP sequence Q. S is the QP sequence suggested by the ROI analyzer. A decoder has no knowledge of S, so that if R(Q) did depend on S, then the representation of Q would not be decodable.) We use the convention here that $R(Q)=+\infty$ if Q is not representable. The differential encoding employed in MPEG-4, H.263, and H.263+ suggests that R(Q) can be a summation of macroblock-level non-negative cost components given by, $$R(Q) = \sum_{i=1}^{n} r(q_i, q_{i-1}), \quad (2)$$

where the form $r(q_i, q_{i-1})$ is suggestive of the fact that the number of bits $q_i$ used for encoding the QP of the $i^{th}$ macroblock depends on the quantizer parameter of the previous macroblock, namely $q_{i-1}$. For the first macroblock (i=1), for which a previous macroblock QP is not available, the QP that has been specified in the frame layer, called here PQUANT, can be used. Equivalently, $q_0$ is defined to be equal to PQUANT.

Adding the R(Q) and the D(Q,S) components yields the derived condition, $$C(Q, S) = D(Q, S) + R(Q) = \sum_{i=1}^{n} [d(q_i, s_i) + r(q_i, q_{i-1})]. \quad (3)$$

We now define a lowest cost function C* and an optimal QP sequence Q*. The lowest cost C* is a function of S, and is defined as follows:

$$C^*(S) = \min_{Q}[C(Q, S)], \quad (4)$$

and Q* is defined to be the QP sequence Q yielding the lowest cost. A constrained version of C*( ), denoted $C_k^*$( ), is a cost function that considers the minimization over candidate sequences ending with $q_{last} = k$, and is defined here to be given by, $$C_k^*(S_t) = \min_{Q_{t,k}}[C(Q_{t,k}, S_t)]. \quad (5)$$

A key definition used in the optimization algorithm described below concerns the constrained minimization C*( ).

Finally, $Q^*_{t,k}$ is defined to be the $Q_{t,k}$ that yields the lowest cost. ($Q_{t,k}$ denotes a partial sequence $Q_t$ whose last element $q_t$ has the value k.)

Derivation of the Optimization Algorithm Used in the Invention

C*( ) and $C_k$*( ) relate to each other as follows:

$$C^*(S) = \min_k [C_k^*(S)]. \quad (6)$$

The goal here is to compute C*(S), as given by equation (6), and the associated Q*. Therefore, $C_k$*(S) must be computed for k values in the dynamic range of suggested QP values. To compute $C_k$*(S), the definition of $C_k$*(S) given by equation (5) is used to arrive at the following set of recursion relations:

$$C_k^*(S_1) = d(s_1, k) + r(k, q_0), \quad (7)$$

$$C_k^*(S_t) = d(s_t, k) + \min_j [r(k, j) + C_j^*(S_{t-1})], \quad (8)$$

where $q_0$ is the value of QP for the macroblock immediately preceding the macroblock for which an optimum QP sequence is being determined, or some other appropriate value, such as a frame-level QP value (i.e. a QP value used for the entire frame).

At the recursion step (8), let j* denote the minimizing j value, i.e. the value of j that minimizes $r(k,j)+C_j^*(S_{t-1})$. Then $q_{t-1}=j^*$ is the best preceding state to $q_t=k$. (Recall that the k and j variables of the quantity r(k,j) are the values of $q_t$ and $q_{t-1}$, respectively.) In other words, if the optimal sequence has $q_t=k$, then it must also have $q_{t-1}=j^*$. Represent this relation by the notation, $$bestPrev_t(k)=j^*.$$

(Such a relation is fundamental to Viterbi-type algorithms.)

The optimization (finding the QP sequence Q yielding the lowest cost) is then performed by recursively computing $C_k$*(S) according to equations (7) and (8), and then computing C*(S) from equation (6). Storing the best preceding state j* for each (t,k) pair during the recursive computation allows tracing back to the optimal QP sequence associated with the lowest cost that has been computed.

The Algorithm as Pseudo-code

The algorithm derived above can be expressed in pseudo-code as follows.

```
For t = 1 to n {where n is the number of macroblocks in a frame}
    For k = QP_min to QP_max in increments of 1 {where QP_min and
        QP_max are some minimum and some maximum possible
        QP value respectively, typically from 1 to 31}
            equations (7) and (8), i.e. according to C*_k(S_1) = d(s_1, k) + r(k, q_0) and
            C*_k(S_t) = d(s_t, k) + min [r(k, j) + C*_j(S_{t-1})];
                                   j Set j* to the value of j that minimizes r(k, j) + C*_j(S_{t-1});

Set bestPrev_t(k) = j*;
Compute C*(S) according to Equation (6), i.e. according to C*(S) = min[C*_k(S)],
            k and so determine k*, the value of k that
``` provides the minimum of all $C_k$* (S);
Set $q_n = k^*$;
For i = n − 1 down to 1
    Set $q_i$ = bestPrev$_{i+1}(q_{i+1})$;
End.

The sought-after QP sequence is then $\{q_1, q_2, \ldots, q_n\}$, and is a tradeoff between the suggested QP sequence and the bit budget, i.e. is the QP sequence that maximizes the cost function C(Q,S).

Figure 2:
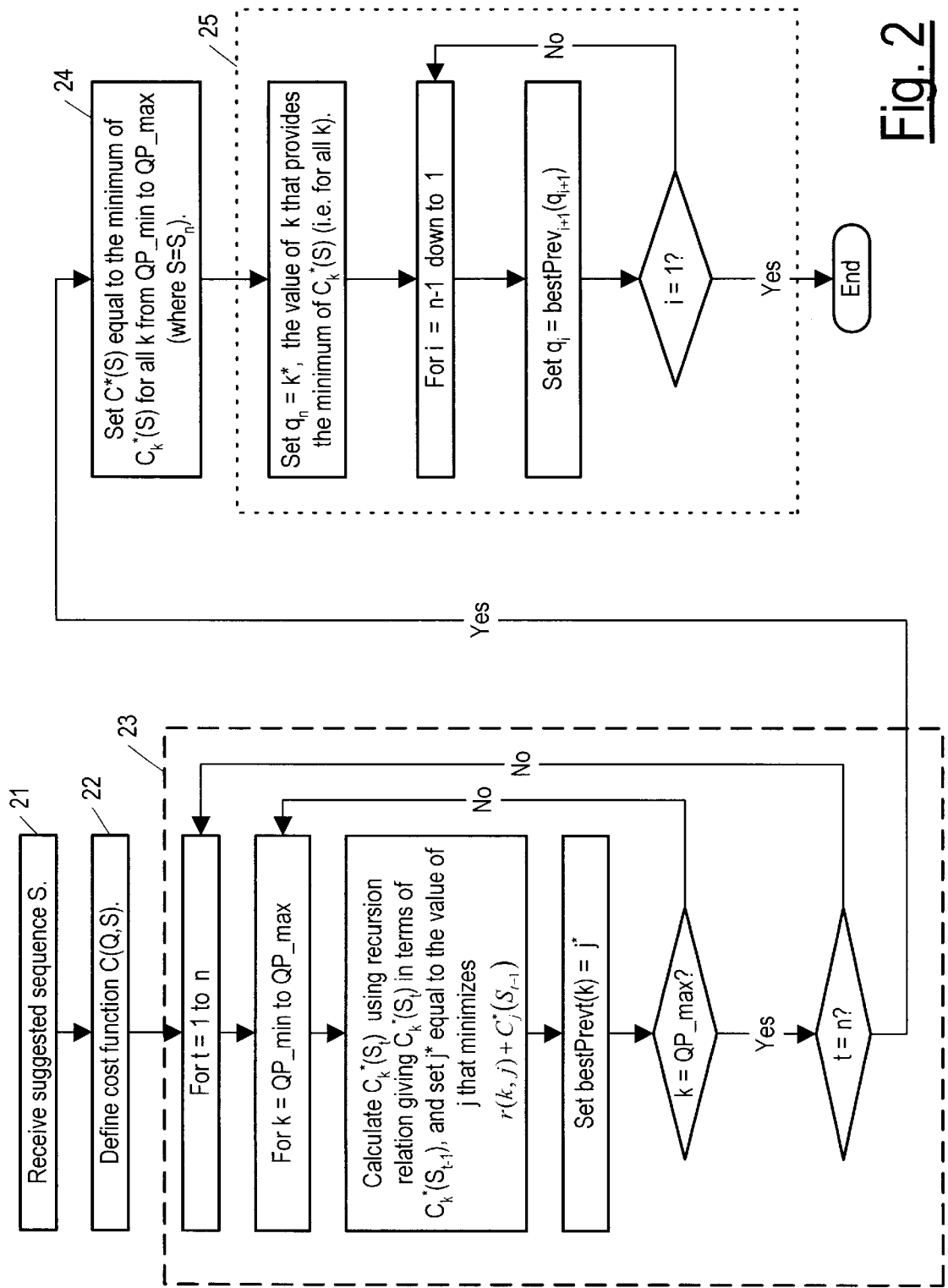
FIG. 2 is a flowchart of the algorithm of the present invention.

FIG. 2 is a flowchart of the QP optimization algorithm of the invention, indicating that the invention includes generally a step 21 of receiving a suggested quantizer parameter sequence S, a next step 22 of defining a cost function C(Q,S) having a component D(Q,S) representing a discrepancy between the candidate sequence Q and the suggested quantizer parameter A sequence S as measured according to a predetermined criterion, and having a component R(Q) proportional to the number of bits spent in representing the candidate sequence Q; and a series of steps 23 24 25 leading to a determination of the optimizing quantizer parameter sequence Q*, i.e. the optimizing sequence Q* that minimizes the cost function C(Q,S). The flowchart also indicates the detail, in accord with the above description, of the series of steps 23 24 25 leading to a determination of the optimizing quantizer parameter sequence Q*.

Architecture of a Coding Control Module According to the Invention

Referring now to FIG. 3, the coding control module 14 of FIG. 1 is shown in more detail as including an optimizer module 14a that determines, according to the algorithm of the invention, the optimum QP sequence, the optimization being based on a cost function C(Q,S) with a specific definition of each of the two components D(Q,S) and R(Q). (The definition of the cost function is provided as an input to the optimizer module.) The optimization module uses as an input the suggested sequence S provided for example by an ROI engine 31 (usually external to the coding control module 14). The optimizing sequence Q is provided to a controller module 14b, which then provides the operational parameters p, t, qz and q to a video coder (not shown).

The coding control module 14 may include (if not shown separately) the ROI engine 31, and if so, it should have video in as an input. However, the ROI engine can also be shown as the generator or source of the cost function signal input to the coding control module 14. The cost function can have very different forms.

Various Embodiments of the Invention, Including the Best Mode

Different definitions of the cost components $r(q_i,q_{i-1})$ and $d(q_i,s_i)$ of equations (1) and (2) lead to different embodiments of the invention. Any sensible cost function, i.e. any cost function having the properties (a)–(d) noted above, can lead to a worthwhile embodiment. An embodiment of the invention is any video encoder, preferably according to either H.263, MPEG-4 VLBV, or H.263+, in which a processor performs frame-level QP control using the QP optimizing algorithm described above.

Two embodiments are described here: a simple mode, intended to be relatively inexpensive to implement, and a high performance mode, which is the preferred embodiment in general, although in some applications the simple mode is preferable.

The Simple Mode

The simple mode applies mainly to video source encoders according to MPEG-4 and H.263. In the simple mode, $r(q_i,q_{i-1})$ and $d(q_i,s_i)$ are defined as follows:

$$r(q_i, q_{i-1}) = \begin{cases} 0, \text{for } |q_i - q_{i-1}| \leq 2 \\ +\infty, \text{otherwise} \end{cases}, \quad (9)$$

and $$d(q_i, s_i) = (q_i - s_i)^2. \quad (10)$$

The purpose of the optimizer is to find the "optimum representable approximation." The simple mode emphasizes the representability part in the sense that most of the approximation effort is spent on finding a representable sequence. (Note that this is not an issue in H.263+, since all sequences are representable, but some sequences cost more in bits.) The objective of the simple mode is to approximate the suggested QP sequence as close as possible with a representable sequence. (The ROI engine always suggests a sequence, in which each QP is in the range [1,31]. However, each QP being in [1,31] range is not sufficient for the representability of a sequence, e.g. for H.263, and it is not necessarily the responsibility of the ROI engine to suggest a representable sequence. Keeping the ROI engine free of the responsibility for suggesting a representable sequence makes the ROI engine more portable, since representability is a system-dependent issue. For H.263+, representability is not the main issue, since any QP in the interval [1,31] (integers only) can be represented. Thus, the simple mode is not particularly useful for the operation of a source encoder according to H.263+.

An Example of the Simple Mode

Assume that an ROI engine has produced a suggested QP-sequence of 6, 7, 3, 2, 1, 3 for an arbitrary position within a picture, and that the QP value of the macroblock immediately preceding the first macroblock in the sequence is 5, which is therefore the value to be used for $q_0$ in equation (7). (If the situation is that the previous macroblock QP is not available, then the value of a frame-level QP could be used for $q_0$.

In this example, the number of macroblocks in the sequence being examined is six, so t=[1, 6] and hence n=6 in the notation used in the above equations. Observe that the dynamic range of suggested QP values is from 1 to 7, and since $q_0$ is included in that range, k=[1, 7] in the notation used above. (If the range of suggested QP values does not include $q_0$, then the range should be extended to do so.) FIG. 4 illustrates the results of the computations indicated below.

The next step is to set t=1 and calculate the minimum costs for the constrained partial sequences $C_k^*(S_1)$, where k varies from 1 to 7. The component of the cost function proportional to the bits spent representing Q given by equation (9) yields a value of 0 if the difference between consecutive QP values is 2 or less, and otherwise yields a value of infinity ($\infty$), meaning an unacceptable value. Since the previous QP value is assumed to be 5, the costs for $C_1^*(S_1)$ and $C_2^*(S_1)$ are infinite because the cost component given by equation (9) is infinite for each.

According to equation (7), the cost for $C_3^*(S_1)$ is $$C_3^*(S_1) = d(6,3) + r(3,5),$$

which, by using equations (9) and (10), becomes $$C_3^*(S_1) = (3-6)^2 + 0 = 9,$$

and is thus so recorded in the table of FIG. 4 in the cell for k=3 and t=1 under the column headed by $C_k^*(S_t)$.

The values of the cost function for t=1 and for other values of k are calculated in a similar manner, resulting in: $C_4^*(S) = 4$, $C_5^*(S_1) = 1$, $C_6^*(S_1) = 0$ and $C_7^*(S_1) = 1$. All these values are stored for later use (and are shown in the table of FIG. 4).

The next step is to determine the cost of selecting different QP values for the second macroblock in the sequence, i.e. for t=2. From equation (8), for k=1 and t=2, $$C_1^*(S_2) = d(7, 1) + \min_j [r(1, j) + C_j^*(S_1)].$$

To evaluate $C_1^*(S_2)$, we need to select the best possible value for j, i.e. the value of j that minimizes $r(1,j)+C_j^*(S_1)$. Since only a change of two is allowed in the QP value between adjacent macroblocks (because otherwise the cost is infinite according to equation (9)), for a k value of one, the only possible choices for j are 1, 2 and 3. When selecting the j value, we can look back and see what choice of j produced the lowest total cost for the previous state (t=t−1), or we can calculate the costs for all possible values of j using the equation (8) (and also equations (9) and (10)), and then see what choice of j results in the lowest cost. Regardless of the method used, the result is the same. In this case, with j equal to one or two, the cost is infinite (because $C_j^*(S_1)$ is infinite for j=1 or 2), so the lowest cost for k=1 is for j=3. Substituting 3 for j, we get $$C_1^*(S_2) = (1-7)^2 + [r(1,3) + C_3^*(S_1)],$$
$$= 6^2 + [0+9] = 45$$

and hence $j^*(k,t)=j^*(1,2)=\text{BestPrev}_t(k)=\text{BestPrev}_2(1)=3$. Both of these values (45 and 3) are stored, as indicated in FIG. 4.

Next, for k=2, (and still t=2), $$C_2^*(S_2) = d(7, 2) + \min_j [r(2, j) + C_j^*(S_1)].$$

Again, the selection of the best possible j value has to be made. As a change of ±2 is allowed (between j and k), we now have 4 possible values for j, namely 1, 2, 3 and 4. In the previous state (t=1), the lowest cost for any of these values was $C_4^*(S)=4$, so we choose j=4, yielding, $$C_2^*(S_2) = (2-7)^2 + [r(2,4) + C_4^*(S_1)].$$
$$= 5^2 + [0+4] = 29$$

Thus, for $C_2^*(S_2)$ (i.e. k=2 and t=2) the best preceding state (t=1) has a QP value of 4, and so we set $\text{BestPrev}_2(2)=4$. As indicated in FIG. 4, the rest of the values for t=2 are $C_3^*(S_2)=17$, $C_4^*(S_2)=9$ $C_5^*(S_2)=4$, $C_6^*(S_2)=1$ and $C_7^*(S_2)=0$. Again these values are stored with the corresponding $j^*(k,2)$ values. The process continues in a similar manner for all values of t until $C_7^*(S_6)$ is computed.

Next, all $C_k^*(S_6)$ values are compared, and the lowest value is chosen as $C^*(S)$, according to equation (6). In this example, $$C^*(S) = \min_k [C_k^*(S)] = C_3^*(S) = 2.$$

Now we trace back the "route" that produces the lowest cost by using the stored values for $j^*(k,t)=\text{BestPrev}_t(k)$. To do so, following the above pseudo-code algorithm (third line from the bottom), first set $q_n=k^*$, where $k^*$ is the value of k that produces the lowest cost at t=n. In this example, $q_6$=k*=3. So the last value of our optimal Q* sequence is 3 (since the cost for k=3, which is 2, is the least for all t=6 costs). Next set i=n−1, and get, $$q_i = q_5 = BestPrev_{i+1}(q_{i+1}) = BestPrev_6(3) = j^*(3,6) = 1,$$

so that the second to last value $q_{n-1}$ in our Q sequence is 1. For i=n−2, the value of j*(k,t) is 2, so the next QP value in our sequence is 2, and so on. The chosen sequence is thus: 6, 6, 4, 2, 1, 3, with all but the last value indicated in FIG. 4 by shading of the cells with these values, and the last value (QP=3) is the value of k corresponding to the minimum cost for t=6, which is 2, that value of k being 3.

The High-Performance Mode

The high-performance mode can be used for each of MPEG-4, H.263, and H.263+. Here, $r(q_i,q_{i-1})$ and $d(q_i,s_i)$ are defined as follows:

$$r(q_i, q_{i-1}) = \begin{cases} \lambda N_{q_i,q_{i-1}}, \text{ if } q_i \text{ is representable} \\ +\infty, \text{ otherwise} \end{cases} \quad (11)$$

$$d(q_i, s_i) = \|mse(q_i) - mse(s_i)\| \quad (12)$$

where $\lambda$ is a predefined non-negative value used as rate-distortion trade-off parameter, $N_{q_i,q_{i-1}}$ is the number of bits needed to represent $q_i$ given $q_{i-1}$, and $mse(q_i)$ denotes the mean square error between the original macroblock content and the reconstructed macroblock content when $q_i$ is used as the QP for the macroblock. (The means square error is a measure of discrepancy between two vectors, arrays, images, or, in general, two multi-element quantities having the same rank. The mean square error of a (multi-element) quantity is equal to the mean (average) of the squares of element-wise differences of the indicated quantity and some reference quantity.) (The notation mse is used to indicate a measure of discrepancy between the original pixel values of a macroblock and the encoded pixel values of the macroblock. The encoded pixel values of the macroblock are affected by various coding parameters, including the QP used for the macroblock. However, the original pixel values of the macroblock (the reference quantity) are an input to the video coder, and are not affected in any way by any coding parameter. Thus, for notational convenience, there is usually no express reference to the reference quantity. Thus, mse(q) indicates the mean square error between the original pixel values of a macroblock and the encoded pixel values of the macroblock when q is selected as the QP for encoding the macroblock, or in abbreviated terminology, mse(q) indicates the mean square error between the original macroblock and the encoded macroblock when q is selected as the QP for encoding the macroblock.)

The high-performance mode emphasizes the efficient management of the bit budget, and has as an objective finding the best trade-off between following the suggested QP sequence and minimizing the total bits spent for QP variation. The calculation of $d(q_i,s_i)$ according to equation (12) is computationally costly, but not prohibitive; the required computation is still much less than, for example, the computation required for full-range block-motion estimation, which is the major computation-intensive part of a video encoder.

Discussion

The use of frame-level QP optimization by a video codec according to the invention can be discerned by comparing the output QP distribution of the codec against the video source. Typically, a codec with a frame-level optimizer according to the invention will respond to the need for a sharp QP transition by a non-causal variation of the QP. In other words, such a codec would start increasing (or decreasing) the macroblock QP before such a need arises. Here, before relates to a raster scan order of the macroblocks. The macroblocks are encoded in raster-scan order, i.e. from left to right, top to bottom. If there is a visually important feature, such as a face, in for example the sixth macroblock, and all the other macroblocks contains less important features, then the ROI engine will suggest an abrupt drop in QP for the 6$^{th}$ macroblock. The suggested QP sequence S (suggested by the ROI engine) might then look like {15, 15, 15, 15, 15, 10, 15, 15, ...}. The terms "before" and "non-causal" refer to this 1-D sequence. The need to reduce the QP is said to arise at the index equal to 6 (i.e. the sixth position). The corresponding frame-optimized QP variation for use in an H.263 encoder would look something like {15, 15, 15, 15, 13, 11, 13, 15, 15, ...}. The first variation starts at the macroblock having index equal to 5, which is less than the index of the first visually important macroblock., i.e. it is before the first visually important macroblock. An approximator that does not employ a frame-level optimization would probably start changing the QP only when the index is equal to 6.

It should be understood that the invention comprehends other ways of formulating the distortion measures and cost functions in addition to the ways described above. For example, the component of the cost function proportional to the bits spent in representing a candidate QP sequence can be replaced by a component proportional to (or otherwise based on or correlated with) the bits spent for coding the actual image (including the bits for representing the QP sequence) rather than just the QP sequence. In such a formulation, the impossible QP sequences should again be assigned a cost of infinity (i.e. a relatively very large value), as in the above description, and the distortion measure (whatever it is) should be extended to include a component accounting for the distortion (or coding loss) of the image.

Scope of the Invention

It is to be understood that the above-described arrangements are only illustrative of the application of the principles of the present invention. Numerous other modifications and alternative arrangements may be devised by those skilled in the art without departing from the scope of the present invention, and the appended claims are intended to cover such modifications and arrangements.

What is claimed is:

1. A method for selecting a sequence of quantization parameter values in a video encoder, the video encoder being arranged to encode a video frame as a sequence of n macroblocks and to assign a quantization parameter value for each macroblock of the video frame, the method characterized in that it includes steps (23 24 25) in which quantization parameter values assigned to at least a sub-set of said sequence of n macroblocks are selected so as to minimize a cost incurred for using a candidate quantizer parameter sequence in place of a suggested quantizer parameter sequence, the cost having a component representing a discrepancy between the candidate sequence and the suggested quantizer parameter sequence as measured according to a predetermined criterion.

2. The method of claim 1, further characterized in that said sub-set of said sequence of n macroblocks comprises all of said n macroblocks.

3. The method of claim 1, further characterized in that optimization of said quantization parameter values assigned to at least a sub-set of said sequence of n macroblocks is performed using a Viterbi search algorithm.

4. The method of claim 1, wherein the method is for providing frame-level control of a quantizer parameter QP of a video encoder, the video encoder having one quantizer parameter for each macroblock of a frame, a frame consisting of a number n of macroblocks, the method providing an optimizing quantizer parameter sequence Q* from among a set of all possible quantizer parameter sequences having a quantizer parameter sequence Q as an arbitrary element serving as a candidate quantizer parameter sequence, the optimizing quantizer parameter sequence Q* minimizing a cost function C(Q,S) indicating a cost of using the candidate quantizer parameter sequence Q in place of a suggested quantizer parameter sequence S, the method further characterized in that it comprises:

a) a step (21) of receiving a suggested quantizer parameter sequence S;
  b) a step (22) of defining a cost function C(Q,S) having a component D(Q,S) representing a discrepancy between the candidate sequence Q and the suggested quantizer parameter sequence S as measured according to a predetermined criterion, and having a component R(Q) proportional to the number of bits spent in representing the candidate sequence Q; and
  c) a step (23 24 25) of determining the optimizing quantizer parameter sequence Q* as that which minimizes the cost function C(Q,S); thereby providing an optimizing quantizer parameter sequence Q* that approximates the suggested quantizer parameter sequence S in a bit-efficient way.

5. The method of claim 4, further characterized in that the suggested quantizer parameter sequence S is provided by a region-of-interest analyzer.

6. The method of claim 4, further characterized in that the step (23 24 25) of determining the optimizing quantizer parameter sequence Q* as that which minimizes the cost function C(Q,S), comprises the step (25) of computing, for a value k falling in the range of quantizer parameter values spanned by the quantizer parameters of the suggested quantizer parameter sequence $S_t$, an optimum constrained cost function $C_k^*(S_t)$, the optimum constrained cost function being a function of a partial suggested quantizer parameter sequence $S_t$ of a number t of quantizer parameters and indicating the lowest cost achievable by using any possible partial candidate quantizer parameter sequence $Q_{t,k}$ having as a last, $t^{th}$ element a quantizer parameter with the value k.

7. The method of claim 4, further characterized in that the step (23 24 25) of determining the optimizing quantizer parameter sequence Q* as that which minimizes the cost function C(Q,S), comprises the substeps of:

a) determining from the suggested quantizer parameter sequence S a range of quantizer parameter values from a predetermined minimum to a predetermined maximum;
  b) setting a sequence length t equal to one;
  c) setting a value k equal to the predetermined minimum;
  d) computing an optimum constrained cost function $C_k^*(S_t)$, the optimum constrained cost function being a function of a partial suggested quantizer parameter sequence $S_t$ of the number t of quantizer parameters, the computing of the optimum constrained cost function for t greater than one being based on a recursion relation giving $C_k^*(S_t)$ in terms of $C_k^*(S_{t-1})$ and involving a term $r(k,j)+C_j^*(S_{t-1})$, where r(k,j) is an element of the cost function component R(Q) proportional to the number of bits spent in representing Q with the variable j having a value in the range determined from the suggested quantizer parameter sequence S;
  e) storing for the current t and k the value of j that minimizes the term $r(k,j)+C_j^*(S_{t-1})$;
  f) computing the optimum constrained cost function $C_k^*(S_t)$ and storing for the current t and k the value of j that minimizes the term $r(k,j)+C_j^*(S_{t-1})$ for successive values of k each greater by one than the previous until k is equal to the predetermined maximum and for successive values of t each greater by one than the previous value of t until t is equal to the number of macroblocks in a frame;
  g) determining the optimum cost function $C^*(S_{t=n})$ based on a comparison of $C_k^*(S_{t=n})$ for all k values in the range of quantizer parameter values in the suggested sequence S; and
  h) constructing the optimizing sequence Q* by a process of first setting the quantizer parameter for the last macroblock equal to the value of k that minimizes $C_k^*(S_{t=n})$, and then tracing backward, assigning to each previous quantizer parameter in the optimizing sequence being constructed the value of j stored for the next macroblock.

8. The method of claim 4, further characterized in that the cost function component D(Q,S) is of the form given by the equation, $$D(Q, S) = \sum_{i=1}^{n} d(q_i, s_i),$$

where $d(q_i,s_i)$ is a memoryless macroblock-level nonnegative cost component having as arguments an element $q_i$ of the candidate quantizer parameter sequence and a corresponding element $s_i$ of the suggested quantizer parameter sequence.

9. The method of claim 8, further characterized in that the cost function component R(Q) is of the form given by the equation, $$R(Q) = \sum_{i=1}^{n} r(q_i, q_{i-1}),$$

where $r(q_i,q_{i-1})$ is a memoryless macroblock-level nonnegative cost component expressing a relation between the number of bits used to encode the quantizer parameter for macroblock i and the number of bits used to encode the quantizer parameter for macroblock i−1.

10. The method of claim 9, further characterized in that an element $r(q_i,q_{i-1})$ of the cost function component R(Q) is given by the equation, $$r(q_i, q_{i-1}) = \begin{cases} 0, & \text{for } |q_i - q_{i-1}| \leq 2 \\ +\infty, & \text{otherwise,} \end{cases}$$

and an element $d(q_i,s_i)$ of the cost function component D(Q,S) is given by the equation $$d(q_i,s_i)=(q_i-s_i)^2.$$

11. The method of claim 9, further characterized in that an element $r(q_i,q_{i-1})$ of the cost function component R(Q) is given by the equation, $$r(q_i, q_{i-1}) = \begin{cases} \lambda N_{q_i, q_{i-1}}, & \text{if } q_i \text{ is representable} \\ +\infty, & \text{otherwise} \end{cases},$$

in which λ is a predetermined nonnegative value useful as a rate distortion trade-off parameter and in which $N_{q_i,q_{i-1}}$ is the number of bits for representing $q_i$ given $q_{i-1}$; and also in that an element $d(q_i,s_i)$ of the cost function component $D(Q,S)$ is given by the equation $$d(q_i,s_i)=\|mse(q_i)-mse(s_i)\|,$$

where mse( . . . ) denotes the mean square error between the original macroblock content and macroblock content reconstructed using the indicated quantizer parameter sequence element $q_i$ or $s_i$.

12. An apparatus for selecting a sequence of quantization parameter values in a video encoder, the video encoder being arranged to encode a video frame as a sequence of n macroblocks and to assign a quantization parameter value for each macroblock of the video frame, the apparatus characterized in that it comprises means (14) for assigning quantization parameter values to at least a sub-set of said sequence of n macroblocks selected so as to minimize a cost incurred for using a candidate quantizer parameter sequence in place of a suggested quantizer parameter sequence, the cost having a component representing a discrepancy between the candidate sequence and the suggested quantizer parameter sequence as measured according to a predetermined criterion.

13. An apparatus as in claim 12, further characterized in that said sub-set of said sequence of n macroblocks comprises all of said n macroblocks.

14. An apparatus as in claim 12, further characterized in that optimization of said quantization parameter values assigned to at least a sub-set of said sequence of n macroblocks is performed using a Viterbi search algorithm.

15. An apparatus as in claim 12, wherein the apparatus has frame-level control of a quantizer parameter used by the video encoder and has one quantizer parameter for each macroblock of a frame being processed by the video encoder, a frame consisting of a number n of macroblocks, the frame-level control being based on providing an optimizing quantizer parameter sequence Q* from among a set of all possible quantizer parameter sequences having a quantizer parameter sequence Q as an arbitrary element serving as a candidate quantizer parameter sequence, the optimizing quantizer parameter sequence Q* minimizing a cost function C(Q,S) indicating a cost of using the candidate quantizer parameter sequence Q in place of a suggested quantizer parameter sequence S, the apparatus further characterized in that it further comprises:

a) means (14a) for receiving a suggested quantizer parameter sequence S;

b) means (14a) for defining a cost function C(Q,S) having a component D(Q,S) representing a discrepancy between the candidate sequence Q and the suggested quantizer parameter sequence S as measured according to a predetermined criterion, and having a component R(Q) proportional to the number of bits spent in representing the candidate sequence Q; and c) means (14a) for determining the optimizing quantizer parameter sequence Q*;

the video encoder thereby determining an optimizing quantizer parameter sequence Q* that approximates the suggested quantizer parameter sequence S in a bit-efficient way.

16. An apparatus as in claim 15, further characterized in that the suggested quantizer parameter sequence S is provided by a region-of-interest analyzer (31).

17. An apparatus as in claim 15, further characterized in that the means (14a) for determining the optimizing quantizer parameter sequence Q* that minimizes the cost function C(Q,S) computes, for a value k falling in the range of quantizer parameter values spanned by the quantizer parameters of the suggested quantizer parameter sequence S, an optimum constrained cost function $C_k^*(S_t)$, the optimum constrained cost function being a function of a partial suggested quantizer parameter sequence $S_t$ of a number t of quantizer parameters and indicating the lowest cost achievable by using any possible partial candidate quantizer parameter sequence $Q_{t,k}$ having as a last, $t^{th}$ element a quantizer parameter with the value k.

18. An apparatus as in claim 15, further characterized in that the means (14a) for determining the optimizing quantizer parameter sequence Q* that minimizes the cost function C(Q,S) comprises:

a) means for determining from the suggested quantizer parameter sequence S a range of quantizer parameter values from a predetermined minimum to a predetermined maximum;

b) means for setting a sequence length t equal to one;

c) means for setting a value k equal to the predetermined minimum;

d) means for computing an optimum constrained cost function $C_k^*(S_t)$, the optimum constrained cost function being a function of a partial suggested quantizer parameter sequence $S_t$ of the number t of quantizer parameters, the computing of the optimum constrained cost function for t greater than one being based on a recursion relation giving $C_k^*(S_t)$ in terms of $C_k^*(S_{t-1})$ and involving a term $r(k, j)+C_j^*(S_{t-1})$, where r(k, j) is an element of the cost function component R(Q) proportional to the number of bits spent in representing Q with the variable j having a value in the range determined from the suggested quantizer parameter sequence S;

e) means for storing for the current t and k the value of j that minimizes the term $r(k, j)+C_j^*(S_{t-1})$;

f) means for computing the optimum constrained cost function $C_k^*(S_t)$ and storing for the current t and k the value of j that minimizes the term $r(k, j)+C_j^*(S_{t-1})$ for successive values of k each greater by one than the previous until k is equal to the predetermined maximum and for successive values of t each greater by one than the previous value of t until t is equal to the number of macroblocks in a frame;

g) means for determining the optimum cost function $C_k^*(S_{t=n})$ based on a comparison of $C_k^*(S_{t=n})$ for all k values in the range of quantizer parameter values in the suggested sequence S; and h) means for constructing the optimizing sequence Q* by a process of first setting the quantizer parameter for the last macroblock equal to the value of k that minimizes $C_k^*(S_{t=n})$, and then tracing backward, assigning to each previous quantizer parameter in the optimizing sequence being constructed the value of j stored for the next macroblock.

19. An apparatus as in claim 15, further characterized in that the cost function component D(Q,S) is of the form given by the equation, $$D(Q, S) = \sum_{i=1}^{n} d(q_i, s_i),$$

where $d(q_i, s_i)$ is a memoryless macroblock-level nonnegative cost component having as arguments an element $q_i$ of the candidate quantizer parameter sequence and a corresponding element $s_i$ of the suggested quantizer parameter sequence.

20. An apparatus as in claim 19, further characterized in that the cost function component R(Q) is of the form given by the equation, $$R(Q) = \sum_{i=1}^{n} r(q_i, q_{i-1}),$$

where $r(q_i, q_{i-1})$ is a memoryless macroblock-level nonnegative cost component expressing a relation between the number of bits used to encode the quantizer parameter for macroblock i and the number of bits used to encode the quantizer parameter for macroblock i−1.

21. An apparatus as in claim 20, further characterized in that an element $r(q_i, q_{i-1})$ of the cost function component R(Q) is given by the equation, $$r(q_i, q_{i-1}) = \begin{cases} 0, & \text{for } |q_i - q_{i-1}| \leq 2 \\ +\infty, & \text{otherwise,} \end{cases}$$

and an element $d(q_i, s_i)$ of the cost function component D(Q,S) is given by the equation $$d(q_i, s_i) = (q_i - s_i)^2.$$

22. An apparatus as in claim 20, further characterized in that an element $r(q_i, q_{i-1})$ of the cost function component R(Q) is given by the equation, $$r(q_i, q_{i-1}) = \begin{cases} \lambda N_{q_i, q_{i-1}}, & \text{if } q_i \text{ is representable} \\ +\infty, & \text{otherwise} \end{cases},$$

in which λ is a predetermined nonnegative value useful as a rate distortion trade-off parameter and in which $N_{q_i, q_{i-1}}$ is the number of bits for representing $q_i$ given $q_{i-1}$; and further in that an element $d(q_i, s_i)$ of the cost function component D(Q,S) is given by the equation $$d(q_i, s_i) = \|mse(q_i) - mse(s_i)\|,$$

where mse( . . . ) denotes the mean square error between the original macroblock content and macroblock content reconstructed using the indicated quantizer parameter sequence element $q_i$ or $s_i$.

\* \* \* \* \*

UNITED STATES PATENT AND TRADEMARK OFFICE
CERTIFICATE OF CORRECTION

PATENT NO. : 6,763,068 B2
DATED : July 13, 2004
INVENTOR(S) : Levent Oktem

It is certified that error appears in the above-identified patent and that said Letters Patent is hereby corrected as shown below:

Column 15,
Line 39, delete "sequence $S_t$ an" and substitute -- sequence $S$ an, --.

Column 18,
Lines 36, 37 and 44, delete "$(S_{t=1})$" and substitute -- $(S_{t-1})$ --.

Column 20,
Line 19, delete "$N_{i,qi-1}$" and substitute -- $N_{qi,qi-1}$ --.
Line 23, delete "$d(q_i s_i)$" and substitute -- $d(q_i, s_i)$ --.

Signed and Sealed this

Fifteenth Day of February, 2005

JON W. DUDAS
*Director of the United States Patent and Trademark Office*